May 6, 1958 F. L. LEWIS 2,833,592
TINTED TRANSPARENT SUN VISOR
Filed June 15, 1955
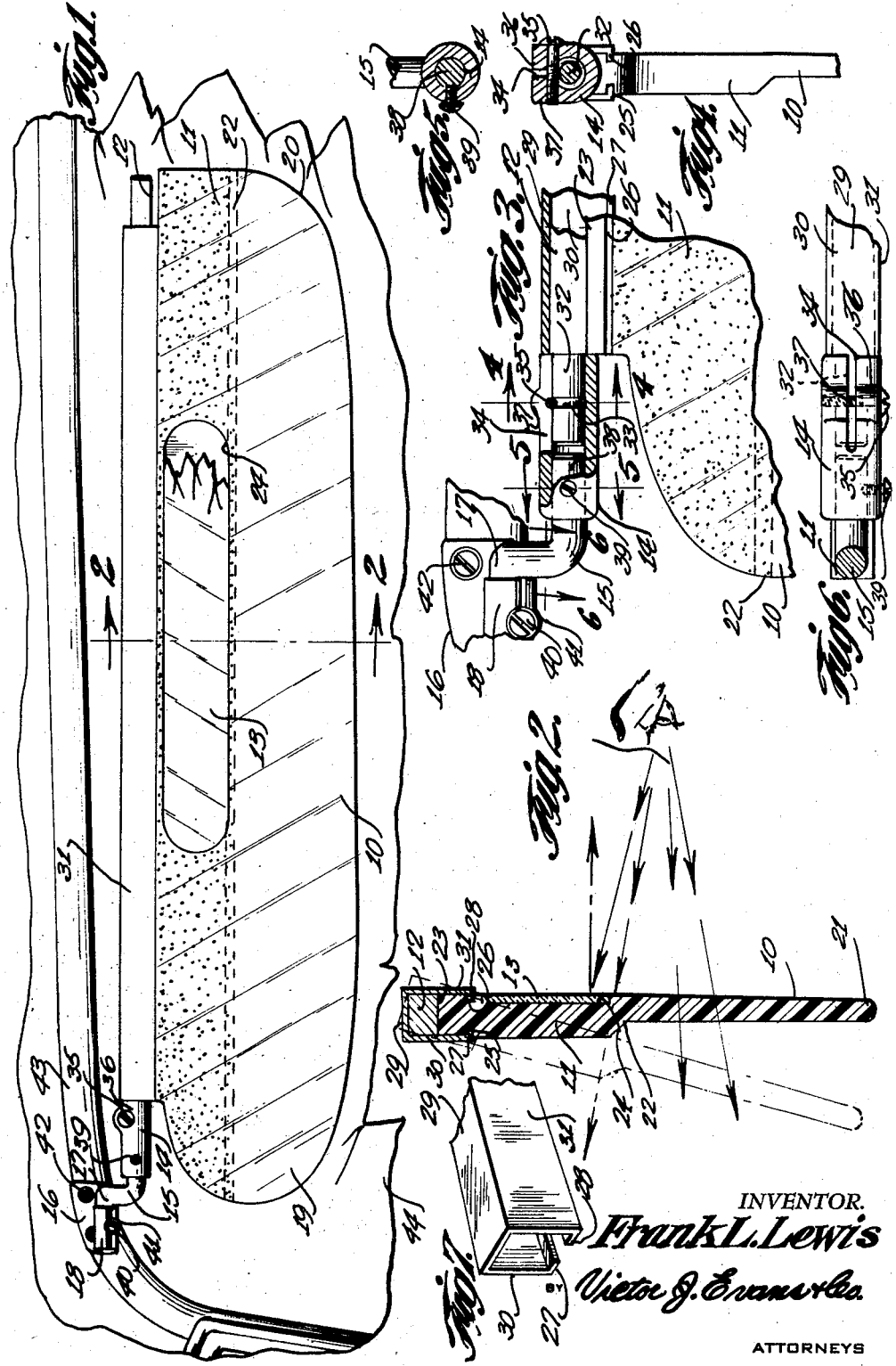
INVENTOR.
Frank L. Lewis
Victor J. Evans & Co.
ATTORNEYS — # United States Patent Office 2,833,592
Patented May 6, 1958

2,833,592

TINTED TRANSPARENT SUN VISOR

Frank L. Lewis, Clearwater, Fla.

Application June 15, 1955, Serial No. 515,610

1 Claim. (Cl. 296—97)

This invention relates to sun visors particularly as used in motor vehicles and of the type adapted to be mounted on the upper inner edge of a windshield, and in particular, a sun visor carried by a pivotally mounted arm with a lower portion of the visor substantially transparent such as may be used for driving in a slight glare such as away from or across the path of the sun and with the upper part translucent and adapted to be used for driving against glare rays and also in which a mirror is inserted in a recess in the rear surface of the visor and adapted to be used as a rear view mirror or for dressing and combing hair and the like of occupants of the vehicle.

The purpose of this invention is to provide an improved sun visor for use in motor vehicles in which the density is adapted to be changed to compensate for glare rays.

Conventional sun visors of motor vehicles are opaque and although various types of attachments have been provided for use on the conventional visors it is difficult to provide an attachment that remains in position and that is not in the way of the operator of the vehicle when not in use.

With this thought in mind, this invention contemplates an improved sun visor wherein sections thereof are of different densities and wherein a mirror is incorporated in a rear surface thereof whereby the device is adapted for driving under favorable conditions and also where light rays make driving difficult.

The object of this invention is, therefore, to provide means for forming a sun visor that is adapted to be used to intercept both bright and moderate glare rays.

Another object of the invention is to provide an improved sun visor in which the blade or body of the visor is transparent or substantially transparent whereby lines of sight are adapted to pass through the material thereof.

Another important object of the invention is to provide an improved substantially transparent sun visor in which means is provided at the back of the visor for retaining a mirror whereby the device is adapted to be used as a rear view mirror or as a mirror for arranging the hair or parts of clothing of occupants of the vehicle.

A further object of the invention is to provide an improved transparent sun visor in which the transparency thereof is of different densities and in which a mirror is combined with the sun visor in which the visor, in its entirety, is of simple and economical construction.

With these and other objects and advantages in view, the invention embodies a sun visor having a lower section of relatively thin substantially transparent material, an upper section of material of greater thickness than the lower section and treated whereby the material is substantially translucent, and a mirror positioned in a recess in the rear surface of the upper section.

Other features and advantages of the invention will appear from the following description, taken in connection with the drawing, wherein:

Figure 1 is an elevational view of the improved visor showing the visor pivotally mounted by a bracket on the inner upper edge of a windshield, parts of the windshield and adjoining parts of the vehicle being broken away.

Figure 2 is a cross section through the improved visor, taken on line 2—2 of Figure 1, with the parts shown on an enlarged scale and showing lines of sight passing through upper and lower sections of the visor and also reflected by the mirror thereof.

Figure 3 is a view illustrating the swivel or pivotal mounting bracket with which the visor is secured to the upper inner edge of a windshield, parts being broken away and parts shown in section and the parts being shown on an enlarged scale.

Figure 4 is a cross section, taken on line 4—4 of Figure 3, showing the mounting bracket and end elevational view of the upper portion of the visor.

Figure 5 is a cross section, taken on line 5—5 of Figure 3, showing a set screw for retaining the tubular body of the bracket in position on a pivotally mounted arm.

Figure 6 is a sectional plan, taken on line 6—6 of Figure 3, showing a section through the arm and showing the upper portion of the tubular connecting sleeve and windshield in plan.

Figure 7 is a view showing a channel shaped moulding strip with flanged lower edges for securing the visor to a shaft providing an arm extended from the mounting bracket.

Referring now to the drawing, wherein like reference characters denote corresponding parts, the improved two stage non-glare sun visor of this invention includes a device having a lower section 10 of substantially transparent material, an upper section 11 of substantially translucent material, a shaft 12 providing a visor carrying arm, an insert 13 having a reflecting surface providing a mirror, and a coupling sleeve 14 connecting the shaft or arm 12 to an arm 15 of a mounting bracket or base 16, an upper end 17 of the arm 15 being frictionally held in a socket 18 on the mounting base 16.

The lower section 10 of the visor is provided with arcuate corners 19 and 20 and this section, which is relatively thin, as shown in Figure 2, extends from an arcuate lower edge 21 to a point 22 where the material of the visor extends outwardly providing the relatively thick upper section 11 and the section 11 extends upwardly from the point 22 to a point 23, at the lower edge of the shaft 12. The upper or relatively thick section 11 is provided with a recess 24 in which the mirror 13 is positioned.

The upper edge of the upper portion 11 of the visor is provided with grooves 25 and 26 into which flanges 27 and 28, respectively, extend with the channel shaped member including a back 29 and side walls 30 and 31 positioned over the shaft 12 and upper portion of the upper section 11. By this means the moulding or backing strip provides a connecting member supporting the sections 10 and 11 of the visor from the arm or shaft 12.

The shaft 12 is provided with a pin 32 having an annular recess 33 therein and with the pin 32 extended into the split end of the coupling sleeve 14 the visor is adapted to be frictionally secured on the end of the arm 15. The end of the coupling sleeve is provided with a slot 34 and with a screw 35 extended through a flange or lip 36 and threaded into a flange or lip 37 at the opposite side of the slot 34 whereby the friction by which the visor is retained in the coupling sleeve is readily adjustable.

The opposite end of the coupling sleeve is secured on an end 38 of the arm 15 with a screw 39 and the opposite end 17 of the arm is frictionally held in the socket 18 on the mounting plate 16 with a screw 40 which extends through flanges 41, similar to the flanges 36 and 37 of the coupling sleeve. The mounting bracket or plate 16 is secured by screws 42 to a trim or moulding 43 of a windshield 44.

With the parts assembled as illustrated and described, the two stage non glare sun visor is mounted on the inner upper corner of a windshield, similar to the mounting of a conventional visor, whereby visors may be extended from each side of the vehicle, and with the visor moved downwardly to the position shown in Figure 1 moderate glare such as that from the sun with the sun behind or at one side of a vehicle is taken through the lower portion 10 of the visor and direct glare such as that of the sun positioned in front of the vehicle or the glare of headlights of an approaching vehicle or of light from other sources is taken through the upper portion 11 of the visor wherein the bright rays are intercepted, as illustrated in Figure 2, and by moving the eyes upwardly or downwardly either portion of the visor may be used.

The mirror 13 may be used only in the visor on the right hand side of the vehicle whereby it is adapted to be used by occupants thereof or the mirror may also be positioned to be used as a rear view mirror as may be desired.

It will be understood that modifications, within the scope of the appended claim, may be made in the design and arrangement of the parts without departing from the spirit of the invention.

What is claimed is:

In a two stage non-glare sun visor, an elongated body, a shaft providing a visor support, the upper portion of said body being of greater thickness than the lower portion thereof, the upper edge of the upper portion of the body being provided with grooves therein, a channel member positioned over said shaft and over the upper edge of the body and said channel member including a back and side walls, said side walls being arranged in spaced parallel relation with respect to each other, said side walls being arranged at right angles with respect to said back, flanges extending from said side walls and extending into said grooves, said shaft including a pin member having an annular recess therein, a coupling sleeve including a split end portion receiving said pin member, there being a slot in said coupling sleeve, lips arranged on opposite sides of said slot, a screw member extending through said lips and positioned to mesh with the recess in said pin member for clamping the pin member in the coupling sleeve, a Z-shaped mounting arm having an end portion thereof projecting into an end of said sleeve, a mounting member connected to the other end of said arm, and a screw member connecting said sleeve to said arm.

References Cited in the file of this patent

UNITED STATES PATENTS

| | | | |
|---|---|---|---|
| 1,470,553 | Church | Oct. 9, | 1923 |
| 2,163,495 | Levy | June 20, | 1939 |
| 2,184,360 | Nichols | Dec. 26, | 1939 |
| 2,207,668 | Hudgings | July 9, | 1940 |
| 2,526,889 | McComb | Oct. 24, | 1950 |
| 2,528,038 | Crise | Oct. 31, | 1950 |
| 2,634,161 | Beets | Apr. 7, | 1953 |
| 2,660,390 | Schultz | Nov. 24, | 1953 |

FOREIGN PATENTS

| | | | |
|---|---|---|---|
| 499,444 | Great Britain | Jan. 24, | 1939 |